United States Patent [19]

Dobson

[11] 3,906,364

[45] Sept. 16, 1975

[54] SIGNAL TRANSMISSION SYSTEMS WITH DOPPLER SHIFT COMPENSATION

[75] Inventor: William Dobson, Chelmsford, England

[73] Assignee: The Marconi Company Limited, Chelmsford, England

[22] Filed: July 27, 1973

[21] Appl. No.: 383,324

[52] U.S. Cl. .......................... 325/4; 325/5; 325/17; 325/63; 343/7.5; 343/179; 343/227

[51] Int. Cl.$^2$ .......................... H04B 7/26

[58] Field of Search .......... 325/4, 5, 17, 41, 49, 63, 325/65; 343/7.5, 179, 225, 227, 228

[56] References Cited

UNITED STATES PATENTS

| | | | |
|---|---|---|---|
| 3,230,453 | 1/1966 | Boor et al. | 325/17 |
| 3,263,173 | 7/1966 | Collins, Jr. et al. | 325/17 |
| 3,317,909 | 5/1967 | Waetjen | 343/7.5 |
| 3,428,898 | 2/1969 | Jacobsen et al. | 325/17 |
| 3,450,842 | 6/1969 | Lipke et al. | 325/4 |

FOREIGN PATENTS OR APPLICATIONS

| | | |
|---|---|---|
| 1,194,035 | 11/1959 | France |

*Primary Examiner*—Robert L. Griffin
*Assistant Examiner*—Marc E. Bookbinder
*Attorney, Agent, or Firm*—Baldwin, Wight & Brown

[57] ABSTRACT

A transmitter for sending a clock signal to a satellite includes a receiver for receiving the clock signal after reflection or re-transmission by the satellite. This received clock signal is used to compensate for doppler frequency shifts introduced by the relative movement between the transmitter and the satellite so that the satellite always receives a correct and stable clock frequency.

7 Claims, 2 Drawing Figures

SIGNAL TRANSMISSION SYSTEMS WITH DOPPLER SHIFT COMPENSATION

Figure 1:
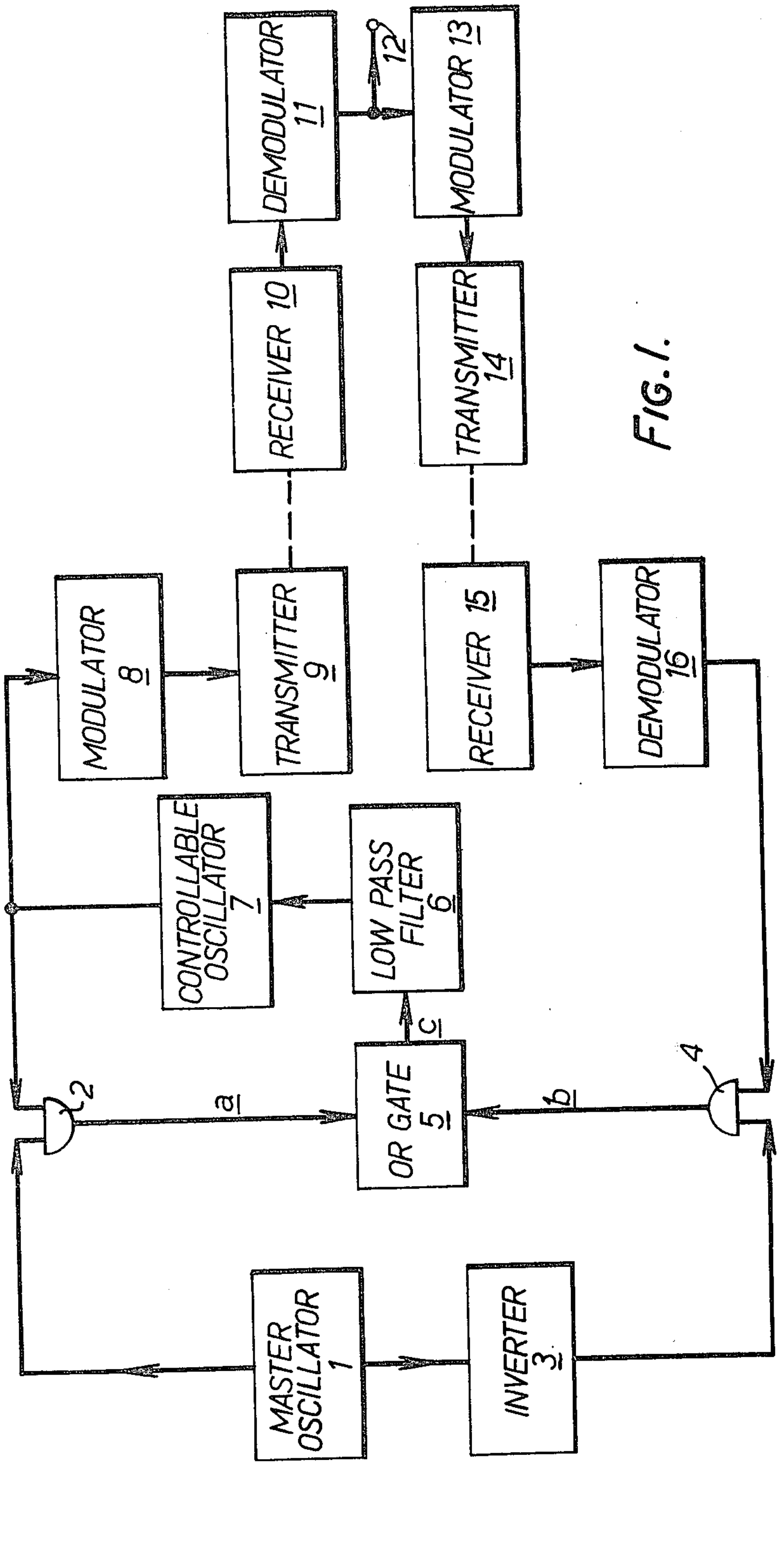

This invention relates to signal transmission systems, and more particularly to systems in which a signal is transmitted from a first point to a receiver at a second point which receiver may be movable relative to the first point during transmission. Where the signal contains information which is a function of time distortion of the signal occurs when during transmission the receiver has a component of movement relative to the transmitter along a line joining the two. This distortion is generally referred to as the doppler frequency shift. This distortion causes serious problems where it is desired to transmit a highly stable reference electrical oscillation in this way. For example, it is a requirement to provide a highly stable source of reference electrical oscillations for use as a clock signal in satellites, and in particular in so-called earth communication satellites. However because satellites are subject to severe environmental conditions during launch and in operation, such sources of reference electrical oscillations on board a satellite do not exhibit sufficiently reliable or accurate characteristics. Whilst it is known to transmit signals to a satellite from earth, because of the variable relative movements and hence variable doppler frequency shifts introduced thereby such transmissions have proved unsatisfactory even though the doppler frequency shifts introduced are normally very small.

The present invention seeks to provide a transmission system in which compensation may be provided for the effect of doppler frequency shift of the signals received by the satellite.

According to this invention a transmission system for effecting reception at a spaced relatively movable receiver of a signal having a first frequency includes a transmitter for generating and transmitting a signal having a second frequency; a receiver for receiving signals at a third frequency which signals have been transmitted by or reflected from said movable receiver; and means for controlling in dependence upon the difference between the second and third frequencies the value of the second frequency such that the signal received at said movable receiver is equal to said first frequency.

Obviously if the signal is not simply reflected by the movable receiver but is a transmitted regenerated signal the transmitted regenerated signal must be related to the signal received by the movable receiver. If the regenerated signal is the same frequency as that of the signal received by the mobile receiver of if the signal is simply reflected by the receiver then the second frequency is chosen such that the mid-frequency between it and the third frequency is said first frequency. The regenerated signal could be multiplied by a factor and if so this would have to be taken into account in determining the doppler shift between the transmission system and the movable receiver, the second frequency being derived by adding or subtracting as appropriate the desired doppler shift to the desired first frequency. In the former case, where the relative motion along a direction joining the transmission system and the movable receiver is zero, the third frequency will of course be equal to the second frequency and hence equal to the first frequency.

In the preferred embodiment the transmission system comprises a stable source of signals at said first frequency; a variable oscillator the output of which comprises said second frequency; means for digitally mixing the output of said variable source and said stable source; means for digitally mixing the output of said stable source with said received third frequency signals; and means for deriving from the outputs of the digital mixing means a control signal for controlling the said variable oscillator.

Preferably the signal having the said first frequency and the signal having the said second frequency have a rectangular waveform.

Preferably each of the said digital mixing means is a coincidence gate providing an AND function.

Preferably the said means for deriving from the outputs of the digital mixing means the said control signal is a dual input OR gate to each input of which is fed one of said outputs.

Preferably the output signal provided by the said OR gate is passed through a low pass filter before being applied to control the said variable oscillator.

Preferably said signal having said second frequency is modulated onto a carrier wave prior to transmission.

Figure 2:
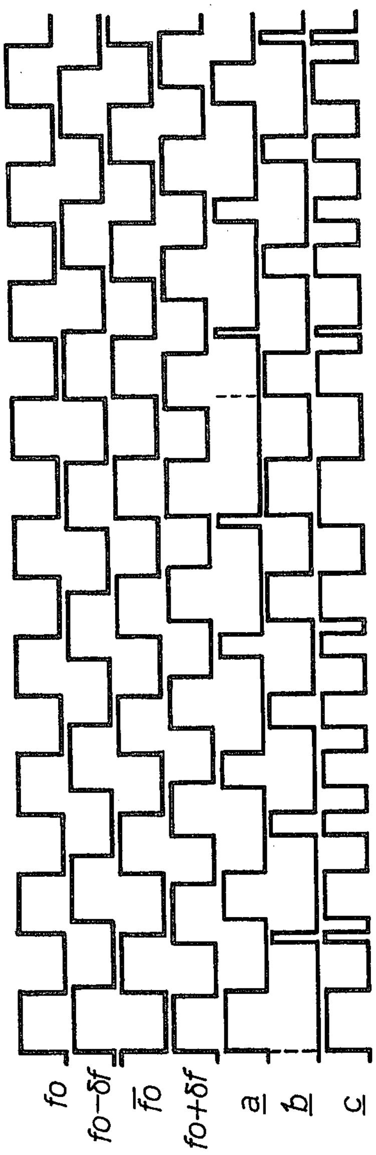

The invention is further described by way of example with reference to the accompanying drawing in which:

FIG. 1 illustrates diagrammatically one embodiment of the present invention, and FIG. 2 is an explanatory diagram.

Referring to FIG. 1 there is shown therein a signal transmission system in which a stable reference electrical oscillation produced thereat situated on the earth is transferred to a satellite. The signal transmission system includes a master oscillator 1 the output of which is fed to one input of a dual input AND gate 2 and also via an inverter 3 to one input of another dual input AND gate 4. The output terminals of gates 3 and 4 are connected to different inputs of a dual input OR gate 5, the output of which is fed via a low pass filter 6 to the control terminal of an oscillator 7 at the output of which is obtained a controllable frequency. The output of the oscillator 7 is connected to the other input of gate 2 and also to a transmitter 9 via a modulator 8. The transmitter 9 transmits the modulated signal to the satellite where it is received by a receiver 10, the output of which is connected to a demodulator 11. The demodulator 11 is connected to a terminal 12 and to a transmitter 14 via a modulator 13. The transmitter 14 transmits the modulated signal back to earth where it is received by a receiver 15 the output of which is passed via a demodulator 16 to the other input of the gate 4.

The system shown in FIG. 1 operates as follows. The master oscillator 1 produces a square wave signal having a first frequency which is mixed by the AND gate 2 with a square wave signal having a second frequency produced by the variable oscillator 7. The signal produced by the oscillator 7 is modulated onto a carrier wave by the modulator 8 and transmitted to the satellite which extracts the modulation signal and passes it to terminal 12 for utilisation. If the satellite is moving toward the earth then if the frequency (referred to herein as the second frequency) produced at the oscillator 7 is $f$ the frequency obtained at terminal 12 is $f + \delta f$ where $\delta f$ is the doppler frequency introduced by the motion of the satellite relative to the earth. This frequency $f + \delta f$ is modulated onto a carrier wave by modulator 13 and transmitted back to the receiver 15. The received frequency (referred to herein as the third frequency) is approximately $f + 2\delta f$ as a further doppler frequency shift is introduced. The third frequency is mixed by the AND gate 4 with the first frequency produced by the master oscillator 1 as inverted by the inverter 3. The feed back loop comprising the OR gate 5, low pass filter 6 and oscillator 7 in conjunction with the gates 2 and 4 ensures that the frequency produced by the oscillator 7 (i.e., the second frequency) is such that the first frequency lies midway between the second and third frequencies.

Thus if the first frequency produced by the master oscillator 1 is $fo$, the oscillator 7 produces a frequency of $fo - \delta f$. Consequently the frequency obtained at terminal 12 is $fo$ and the frequency obtained at the output of the demodulator 16 is $fo + \delta f$.

Typical waveforms illustrating the operation of the feedback loop are shown in FIG. 2, the waveforms illustrating the situation existing when correct operation of the feedback loop is established. The magnitude of $\delta f$ is greatly exaggerated for the purpose of illustration. In practice $\delta f$ would be very small. For example if the frequency $fo$ of the master oscillator 1 is 1 MHz. A typical maximum radial velocity for a geostationary satellite is 3.7 meters/second giving a maximum value of $\delta f$ of 0.013 Hz (period 77 seconds).

The waveforms references *a*, *b* and *c* in FIG. 2 represent the waveforms present at the points similarly referenced in FIG. 1. The waveform c has a period equal to the period of $\delta f$ i.e., 77 seconds in the example given above, and it is arranged that the low pass filter has a cut-off frequency above that of the highest expected value of $\delta f$, but below that of $fo$. Thus the low pass filter 6 provides as an output a signal the amplitude of which is dependent on the mark-to-space ratio of waveform *c*. Conveniently it may be arranged by suitable biasing that the one-to-one mark space ratio corresponds to a zero d.c. level. If the value of the frequency provided by oscillator 7 departs from its correct value, the mark space ratio varies at a rate dependent on the frequency error. The sense of the signal obtained from the OR gate 5 is arranged to correct the frequency provided by the oscillator 7.

Whilst the invention is especially applicable to communications satellites and the like the invention is not restricted to this application, but may be used for example to transfer reference signals between two or more aircraft.

I claim:

1. A transmission system including a first station and a second station which is spaced from said first station, one of said stations being relatively movable with respect to the other, said second station having means for receiving signals transmitted to it by said first station, and means for transmitting signals to said first station, and said first station including:

a transmitter for transmitting signals to said second station to effect reception thereat of a signal having a first frequency, the signals transmitted by said first station having a second frequency at the point of transmission, a receiver for receiving signals returning from said second station said returning signals being received at said first station being at a third frequency, and means for controlling the value of the second frequency in response to said second and third frequencies such that the frequency of the signal received at said second station is equal to said first frequency, said controlling means including a stable source of signals at said first frequency; a variable oscillator the output of which comprises said second frequency connected to said transmitting means at the first station; combining means for combining the output of said variable oscillator and said stable source; combining means for combining the output of said stable source with said received third frequency signals; and means for deriving from the outputs of the two combining means a control signal for controlling the said variable oscillator.

2. A transmission system as claimed in claim 1 wherein the signal having the said first frequency and the signal having the said second frequency have a rectangular waveform.

3. A transmission system as claimed in claim 1 wherein each of the said combining means is a coincidence gate providing an AND function.

4. A transmission system as claimed in claim 1 wherein the said means for deriving from the outputs of the two combining means the said control signal is a dual input OR gate to each input of which is fed an output of each combining means, respectively.

5. A transmission system as claimed in claim 4 including a low pass filter connected to the output signal provided by the said OR gate and having an output applied to control the said variable oscillator.

6. A transmission system as claimed in claim 1 wherein the combining means are digital in nature.

7. A transmission system including a first station and a second station which is spaced from and relatively movable with respect to said first station;

said first station including first means for generating signals at a selected first frequency, second means for generating signals at a variable second frequency, means for transmitting signals of said second frequency, and control means connected to said first generating means and said second generating means for controlling said second generating means such that said second frequency is equal to said first frequency minus the Doppler shift produced by the relative motion of said second station, whereby signals as received by said second station are at said first frequency; said second station including receiver means for receiving said transmitted signals, and means for returning said signals received at the second station to arrive at said first station at a third frequency which is equal to said first frequency plus said Doppler shift; said first station also including receiver means for receiving said signals of said third frequency; and said control means comprising first combining means for combining said signals of said first and second frequencies, combining and inverting means connected to said receiver means of the first station and to said first generating means for combining said signals of said third frequency and the complement of said signals of said first frequency, and means combining the outputs of said first combining means and said combining and inverting means and connected to said second generating means for controlling it so as to produce said signals of said second frequency.

* * * * *